United States Patent [19]

Rose

[11] Patent Number: 4,755,130

[45] Date of Patent: Jul. 5, 1988

[54] APPARATUS FOR OBTAINING A FIXING IN A WALL

[75] Inventor: Neil Rose, Bishop Auckland, England

[73] Assignee: Black & Decker Inc., Newark, Del.

[21] Appl. No.: 24,588

[22] Filed: Mar. 11, 1987

Related U.S. Application Data

[62] Division of Ser. No. 918,154, Oct. 14, 1986, Pat. No. 4,674,257.

[30] Foreign Application Priority Data

Oct. 15, 1985 [GB] United Kingdom ............... 8525356

[51] Int. Cl.⁴ ............................................. B29C 47/36
[52] U.S. Cl. .................................. 425/376.1; 52/743; 141/392; 425/463; 425/464; 425/466; 425/467; 425/DIG. 227
[58] Field of Search ............ 425/DIG. 227, 460, 461, 425/462, 464, 468, DIG. 227, 11, 12, 13, 113, 325; 364/30, 36, 267, 278; 141/392; 52/743; 144/344, 353, 365; 411/302, 907, 908

[56] References Cited

U.S. PATENT DOCUMENTS

| | | | |
|---|---|---|---|
| 1,445,339 | 2/1923 | Matthews | 141/392 |
| 1,883,196 | 10/1932 | Wertz | 264/36 |
| 1,953,452 | 4/1934 | Wertz | 264/36 |
| 3,211,813 | 10/1965 | Behrendt | 264/36 |
| 3,492,381 | 1/1970 | Rhyne | 264/36 |
| 4,032,272 | 6/1977 | Miller | 425/12 |
| 4,044,512 | 8/1977 | Fischer et al. | 52/127 |
| 4,047,863 | 9/1977 | McCluskey | 425/12 |
| 4,103,498 | 8/1978 | Steinborn et al. | 264/36 |
| 4,149,350 | 4/1979 | Fischer et al. | 52/704 |
| 4,211,049 | 7/1980 | Fischer | 52/704 |
| 4,452,285 | 6/1984 | Leibhard et al. | 141/392 |
| 4,552,287 | 11/1985 | Dziki | 425/87 |

FOREIGN PATENT DOCUMENTS

| | | |
|---|---|---|
| 470761 | 8/1937 | United Kingdom . |
| 500109 | 1/1939 | United Kingdom . |
| 888076 | 1/1962 | United Kingdom . |

Primary Examiner—Willard Hoag
Attorney, Agent, or Firm—Edward D. Murphy; Harold Weinstein; Edward D. C. Bartlett

[57] ABSTRACT

A fixing in a wall is made by drilling a hole, inserting the pin of a nozzle mounted on a hot melt gun into the hole and injecting molten polypropylene into the space between the pin and the hole. The polypropylene is allowed to solidify and the nozzle is removed leaving a wall plug ready for the insertion of a screw. Three embodiments of a nozzle especially adapted for use in this process are described. nozzle has a hollow screw-threaded base with a pin extending forwardly therefrom. Passageways in the base each communicate at one end with the interior of the base and at another end externally of the base and the pin in the vicinity of the junction between the pin and the base. A flexible seal is slidably mounted on the base and resiliently biased towards the pin.

19 Claims, 4 Drawing Sheets

APPARATUS FOR OBTAINING A FIXING IN A WALL

This is a division of application Ser. No. 918,154, filed Oct. 14, 1986 now U.S. Pat. No. 4,674,257.

FIELD OF THE INVENTION

This invention relates to nozzles for use in obtaining a fixing in a wall.

BACKGROUND OF THE INVENTION

Conventionally wall fixings are made by drilling a hole of the appropriate size in a wall, inserting a plug of fibrous or plastics material into the hole, and driving a screw into the plug.

In order to obtain a good fixing it is essential that the hole should be of the correct diameter to accommodate the plug. Thus, it is necessary for the handyman to carry a range of masonry drills and a range of plugs of different diameters to make satisfactory fixings with different gauge screws.

Even with a comprehensive range of drills the situation occasionally arises that the masonry surrounding the drill spalls and falls away thus leaving an irregular cavity usually of considerably greater size than that originally intended and totally unsuitable for the insertion of a plug. In such situations it has been proposed, for example in UK - PS No. 470,761 to ram a moist mixture of fibers and a settable material, such as cement, into the irregular cavity. A screw may be inserted in the mixture either before or after it has set. The material may be bored axially with a sharp instrument before the screw is inserted.

This procedure has several disadvantages. Firstly, great care must be taken to ensure that the mixture of fibers and settable material is rammed into the interior of the cavity and does not simply form a shallow plug immediately adjacent the entrance to the cavity. Secondly, when spalling does occur it frequently extends to one or other side of the original hole. Once the cavity has been filled and the mixture set it is often difficult to relocate the site of the initial hole with the result that an attempt may be made to locate a screw through a surface layer of the mixture and brickwork rather than into a hole filled with mixture.

SUMMARY OF THE INVENTION

The present invention, at least in its preferred embodiments, aims to reduce the above disadvantages.

According to the invention in the parent application Ser. No. 918,154 there is provided a method of obtaining a fixing in a wall which method comprises the steps of making a hole in the wall, placing a pin in said hole, inserting a viscous setable material into the space between said pin and said hole, withdrawing said pin from said hole, and driving a screw into said material.

The hole is ideally made with a drill which is greater in diameter than the diameter of the screw. However, because the viscous material will conform to the shape of the hole the hole can be formed in other ways, for example using a cold chisel and a hammer.

The screw may be driven into the viscous setable material either when it is partially set or when it is fully set.

Preferably, the screw is driven into the bore left on removal of the pin, this is not however essential.

The material is preferably a thermoplastics material, for example polypropylene which may conveniently be heated until it is extrudable and extruded into the space. A hot melt gun can conveniently be used for this purpose.

The present invention provides a nozzle for use in a method as above. The nozzle comprises a base, a pin which extends from said base and can be inserted into a hole in a wall, a passageway for conducting, in use, viscous setable material to the space between said pin and said hole, and a resilient member circumjacent said pin which, when said pin is inserted in said hole, forms a seal which inhibits the egress of viscous setable material from said hole.

In one embodiment, the passageway extends along said pin and opens at or adjacent the tip thereof.

In another embodiment, the passageway opens adjacent the root of said pin. This embodiment may also include a further passageway which extends along said pin and opens at or adjacent the tip thereof.

The resilient member may be arranged to form, in use, a seal with the surface of said wall circumjacent said hole.

Preferably, the resilient member is provided with one or more grooves through which, in use, material can escape when said space between said pin and said hole is full.

Preferably, the resilient member is mounted on a collar which is slidably mounted on the base of said nozzle.

Advantageously, means are provided which bias the collar towards the tip of the pin.

If desired, the arrangement may be such that the collar can move relative to the base to an extent that when the resilient member is urged against a wall circumjacent a hole part of the base enters the hole. This is particularly useful where it is desired that the finished wall plug should not extend flush with the surface of the wall.

The passageway may open in a plane substantially parallel or substantially perpendicular to the longitudinal axis of the pin. In the former case when the nozzle is not in use, the collar is preferably arranged to overlie the passageway and inhibit the flow of material therefrom.

If desired, the pin may be removably mounted on the base of the nozzle.

The pin itself is preferably tapered towards its free extremity to facilitate removal from the hole as the material sets and may be coated, if desired, with a release agent. Alternatively it may comprise a material such as polytetrafluoroethylene.

In another embodiment, the resilient member comprises a layer of compressible material circumjacent said pin.

Preferably, the base comprises a threaded portion for threaded engagement with a hot melt gun, said resilient member grips said pin, and the periphery of said resilient member is provided with ribs to facilitate the rotation of said nozzle about the axis of said threaded portion.

Preferably, the ribs extend parallel to the longitudinal axis of the pin.

Advantageously, the base includes a pressure plate which extends in a plane perpendicular to the longitudinal axis of said pin and which abuts one end of said resilient member.

Preferably, the resilient member is generally conical.

Advantageously, said pin is provided with a conical portion which expands towards the root of said pin and protects the forward portion of said resilient member.

It will be appreciated that in order to accommodate screws of different gauges and lengths a set of different pins is desirable. For this purpose each nozzle could be provided with a set of different pins. However, it is more practical to provide a set of nozzles having pins of differing lengths and/or mean diameter.

The present invention also provides a hot melt gun provided with a nozzle in accordance with the invention.

BRIEF DESCRIPTION OF THE DRAWINGS

For a better understanding of the invention reference will now be made, by way of example, to the accompanying drawings in which.

DETAILED DESCRIPTION OF THE PREFERRED EMBODIMENTS

Figure 1:
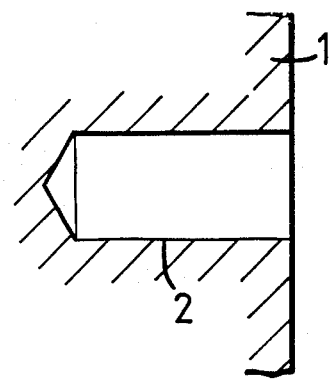
FIGS. 1 to 3 show steps in accordance with use of the invention for obtaining a fixing.
Figure 2:
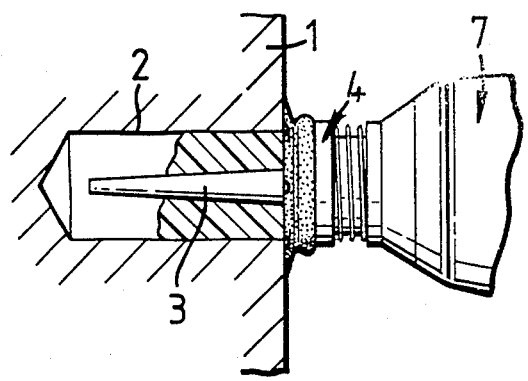
Figure 3:
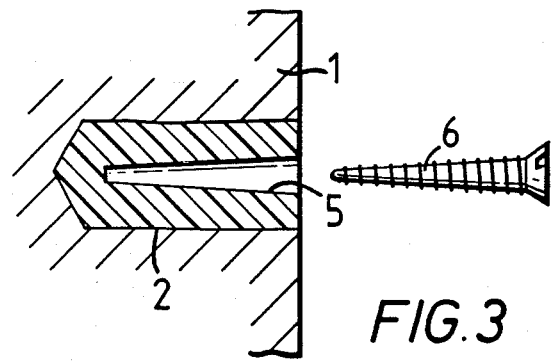

Referring to FIGS. 1 to 3 of the drawings, there is shown a wall 1 of, for example, lightweight blocks in which it is desired to obtain a fixing.

Firstly, as shown in FIG. 1, a hole 2 is drilled in the wall 1.

Secondly, as shown in FIG. 2, a pin 3 of a nozzle 4 is inserted in the hole 2 and polypropylene in its melt state is injected into the space between the pin 3 and the inside of the hole 2.

Finally, after the space between the pin 3 and the inside of the hole has been filled, the polypropylene is allowed to solidify. The pin 3 is then withdrawn leaving a bore 5 for the insertion of a screw 6.

Figure 5:
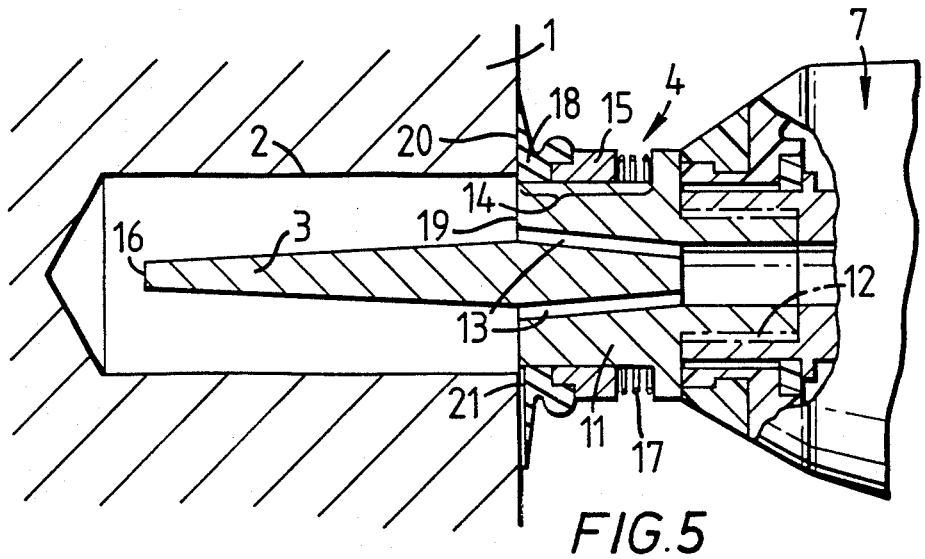
FIG. 5 is a view, mainly in cross section, showing the nozzle ready for use.
Figure 4:
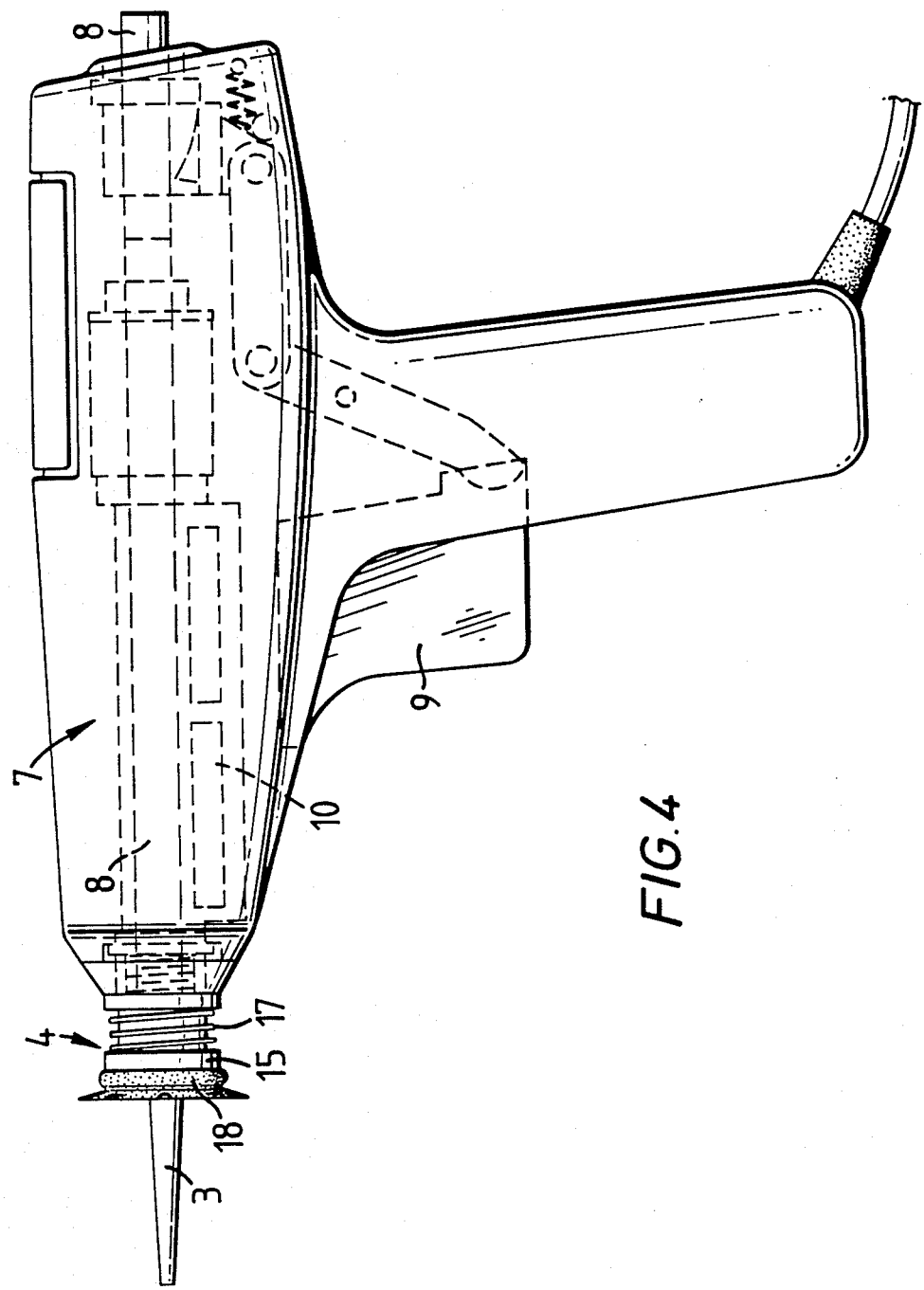
FIG. 4 is a side elevation of one embodiment of a nozzle in accordance with the invention mounted on a hot melt gun.

Referring now to FIGS. 4 and 5, polypropylene in its melt state is injected into the space between the pin 3 and the inside of the hole 2 using a conventional hot melt gun 7 provided with a novel nozzle 4. In particular, a rod 8 of polypropylene is advanced by a trigger 9 into a heater 10 where it is heated to approximately 175° C. The polypropylene melts and further pressure on the trigger 9 extrudes the viscous polypropylene through the nozzle 4.

The nozzle 4 comprises a base 11 and a pin 3 which are made of aluminium. The base 11 comprises a hollow threaded portion 12 which engages a corresponding thread in the tip of the hot melt gun 7.

Five passageways 13 are disposed around the root of the pin 3 and communicate with the interior of the hot melt gun 7.

The radial outer surface of the base 11 of the nozzle 4 comprises a portion 14 of reduced diameter. A collar 15 is slidingly mounted on this portion 14 and is biased towards the tip 16 of the pin 3 by a spring 17 circumjacent the portion 14 of the base 11. A pin (not shown) prevents the collar 15 sliding off the portion 14.

A flexible seal 18 of thermoplastic rubber is mounted on the collar 15.

It will be noted that the pin 3 is tapered towards its tip 16.

As can clearly be seen from FIG. 5, the hole 2 is made slightly longer than the length of the pin 3. As the pin 3 is inserted into the hole 2 the flexible seal 18 comes into contact with the wall 1 surrounding the hole 2. As the pin 3 is inserted further the collar 15 compresses the spring 17. The spring 17 is fully compressed when the leading face 19 of the base 11 is flush with the wall surrounding the hole 2.

When the trigger 9 is depressed the viscous polypropylene, which is typically at 175° C., passes through the passageways 13 at a pressure of approximately $7 \times 10^5$ Pa. The viscous polypropylene enters and substantially fills the space between the pin 3 and the hole 2. The seal between the wall 1 and the flexible seal 18 is sufficient to ensure that the viscous polypropylene penetrates substantially all the available space. Heat from the heater 10 is transmitted to the base 11 of the nozzle 4 via the hollow threaded portion 12 thereby ensuring that the polypropylene does not solidify in the passageways 13. Injection of molten polypropylene is continued until the hole 2 is full. This can be detected by the appearance of plastics material from around the periphery of the flexible seal 18. For this purpose the leading face 20 of the flexible seal 18 is provided with six small radially extending grooves, one of which (groove 21) is shown.

The polypropylene starts to solidify after about 5 seconds and the nozzle 4 is then withdrawn leaving a bore 5 corresponding to the pin 3 which is ready after a further minute or so to receive a screw 6 to make a firm and secure fixing.

Various modifications to the nozzle 4 are envisaged. For example, the pin 3 could be threadedly mounted to the base 11. In such an embodiment the pin could be made of a different material, for example, polytetrafluoroethylene (PTFE). The nozzle 4 could comprise one of a set of similar nozzles, each with the same hollow threaded portion 12 for attachment to the hot melt gun 7 but having different pins to provide bores for screws of different lengths and/or gauges.

In addition, the flexible seal 18 and associated structure could be dispensed with although this is not recommended.

Materials other than polypropylene are also suitable, for example elastomers and synthetic rubber, for example neoprene. Such materials should not shrink appreciably on cooling. Polyamide 6 may be particularly suitable.

Figure 6:
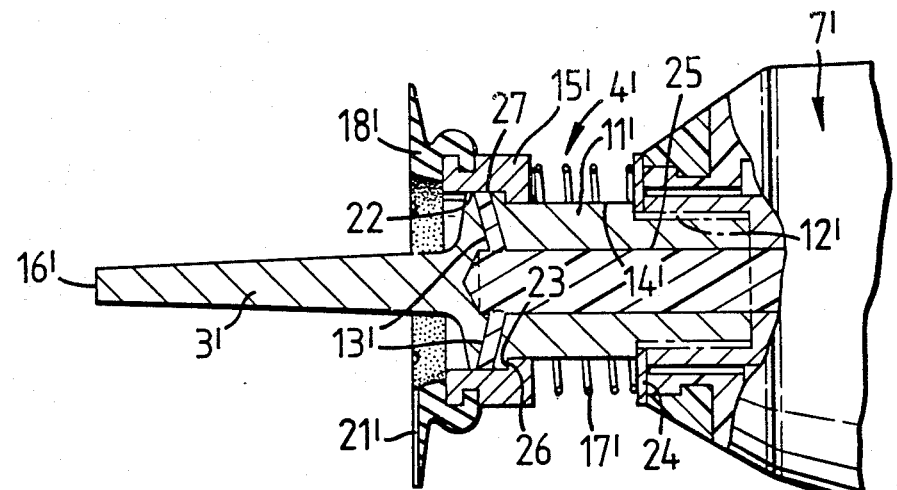
FIG. 6 is a view, mainly in cross section, showing a second embodiment of a nozzle in accordance with the invention mounted on a hot melt gun.
Figure 7:
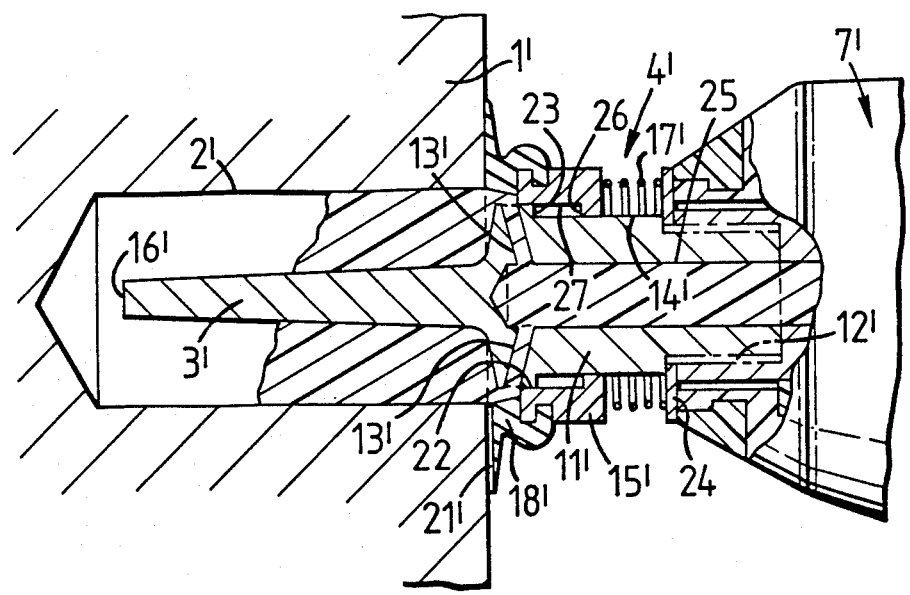
FIG. 7 shows the nozzle of FIG. 6 in use.

If desired, the nozzle may be adapted so that hot polypropylene is inhibited from passing through the passageways when the nozzle is not in use. Such an arrangement is shown in FIGS. 6 and 7. In particular, the nozzle 4' comprises a base 11' having a first portion 22, a second portion 14' and a threaded portion 12'. A stepped collar 15' is slidably mounted on the second portion 14' and is urged towards an abutment formed by the side 23 of the first portion 22 by a spring 17' which acts between the stepped collar 15' and a flange 24 force fitted on the base 11'. A bore 25 extends through the threaded portion 12' and the second portion 14' and terminates in the first portion 22 immediately adjacent the root of the pin 3'. Five passageways 13' extend radially outwardly from the bore 25 and open in the periphery of the first portion 22.

When the nozzle 4' is not in use, (FIG. 6) the spring 17' urges the stepped collar 15' towards the tip 16' of the pin 3'. One part 26 of the stepped collar 15' engages the side 23 of the first portion 22 whilst the other part 27 covers the outlets of the passageways 13'.

When the nozzle 4' is in use, (FIG. 7) insertion of the pin 3' in the hole 2' causes the flexible seal 18' and the collar 15' to be displaced relative to the base 11' to open the passageways 13'. Hot polypropylene can then be injected via the passageways (which are typically 1 to 3 mm in diameter) into the space between the pin 3' and the hole 2'. Since the bore 25 extends to a position immediately adjacent the base of the pin 3', the pin 3' can be kept relatively hot which inhibits the polypropylene setting before the space between the pin 3' and the hole 2' is filled.

Where the wall comprises blocks covered with plaster it is desirable that the fixing should be made in the block rather than in the plaster. In such a situation a hole is drilled through the plaster and the block. However, only the block is filled with plastics material. To inhibit plastics material being present in the plaster the nozzle is shaped so that when the flexible seal is urged against the wall the leading face of the base penetrates the hole until it is flush with the face of the block. Naturally, a small amount of plastics material around the periphery of the hole in the plaster will not be harmful provided that the screw does not exert appreciable radial forces on it which might otherwise crack the plaster.

As mentioned earlier, hot, viscous plastics material can be introduced through the tip of the pin provided that solidification will not occur.

Figure 8:
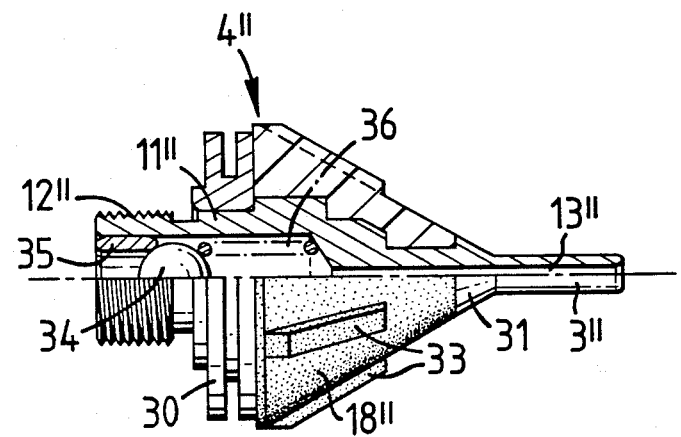
FIG. 8 is a view, partly in section, of a third embodiment of a nozzle in accordance with the invention.

FIG. 8 shows a particularly inexpensive nozzle which is generally identified by reference numeral 4". The nozzle 4" comprises a base portion 11" and a pin 3" which is formed integrally therewith. A pressure plate 30 is mounted on the base 11" and extends in a plane perpendicular to the longitudinal axis of the pin 3". The pin 3" has a conical portion 31 which expands towards the root of the pin 3" and protects the leading portion of a flexible seal 18" made of a resilient high temperature silicon rubber.

The outer surface of the flexible seal 18" is provided with a plurality of ribs 33 which extent parallel to the longitudinal axis of the pin 3".

The base 11" has a hollow threaded portion 12" which contains a stainless steel ball 34 which is biased against a valve seat formed by one end of an insert 35 by a spring 36.

In use, the nozzle 4" is mounted on a hot melt gun via the hollow threaded portion 12". The ribs 33 facilitate this operation, torque being transmitted via frictional engagement between the flexible seal 18" and the pin 3".

When the pin 3" is inserted into a hole the flexible seal 18" engages the side wall of the hole and forms an adequate seal therewith. Molten polypropylene is then delivered from the hot melt gun through the passageway 13" of nozzle 4" by repeatedly actuating the trigger on the hot melt gun. In the case of a large hole part of the ribs 33 may enter the hole. However, it has been found that this barely impairs the seal because of the resilient nature of the flexible seal 18" and the inherently irregular surface of the hole.

When the space between the pin 3" and the hole is filled the trigger on the hot melt gun is released. The nozzle 4" is then withdrawn leaving a bore ready to receive a screw. The stainless steel ball 34 returns against the insert 35 under the influence of spring 36 and inhibits molten glue dripping from the nozzle 4".

What is claimed is:

1. A nozzle for use in a method of obtaining a fixing in a wall which method comprises the steps of making a hole in the wall, placing a pin in said hole with a space between the pin and a bounding interior surface of said hole, inserting a viscous setable material into said space, withdrawing said pin from said hole and driving a screw into said material, which nozzle comprises:
    a base;
    said pin which extends from said base and can be inserted into said hole in said wall;
    a passageway in said nozzle for conducting, in use, viscous setable material to the space between said pin and said hole;
    a resilient member circumjacent said pin which, when said pin is inserted in said hole, forms a seal which inhibits egress of said viscous setable material from said hole;
    said resilient member being provided with one or more grooves through which, in use, material can escape when said space between said pin and said hole is full; and
    said resilient member being mounted on a collar which is slidably mounted on said base of said nozzle.

2. A nozzle as claimed in claim 1, wherein said passageway extends along said pin and opens at or adjacent a tip thereof.

3. A nozzle as claimed in claim 1, wherein said passageway opens adjacent a root of said pin.

4. A nozzle as claimed in claim 1, including means for biasing said collar towards a tip of said pin; and wherein said collar can move relative to said base to an extent that when said resilient member is urged against a surface of said wall circumjacent said hole, part of said base enters said hole.

5. A nozzle for use in a method of obtaining a fixing in a wall which method comprises the steps of making a hole in the wall, placing a pin in said hole with a space between the pin and a bounding interior surface of said hole, inserting a viscous setable material into said space, withdrawing said pin from said hole and driving a screw into said material, which nozzle comprises:
    a base;
    said pin which extends from said base and can be inserted into said hole in said wall;
    a passageway in said nozzle for conducting, in use, viscous setable material to the space between said pin and said hole;
    a resilient member circumjacent said pin which, when said pin is inserted in said hole, forms a seal which inhibits egress of said viscous setable material from said hole;
    said passageway opening in a plane substantially parallel to the longitudinal axis of said pin and also opening in a position such that when said nozzle is not in use said collar overlies said passageway and inhibits the flow of material therefrom.

6. A nozzle according to claim 5, wherein said pin is tapered to facilitate removal from said material.

7. A nozzle for use in a method of obtaining a fixing in a wall which method comprises the steps of making a hole in the wall, placing a pin in said hole with a space between the pin and a bounding interior surface of said hole, inserting a viscous setable material into said space, withdrawing said pin from said hole and driving a screw into said material, which nozzle comprises:
- a base;
- said pin which extends from said base and can be inserted into said hole in said wall;
- a passageway in said nozzle for conducting, in use, viscous setable material to the space between said pin and said hole;
- a resilient member circumjacent said pin which, when said pin is inserted in said hole, forms a seal which inhibits egress of said viscous setable material from said hole;
- said resilient member comprising a layer of compressible material circumjacent said pin;
- said base comprising a threaded portion for threaded engagement with a hot melt gun;
- said resilient member gripping said pin; and
- a periphery of said resilient member being provided with ribs to facilitate rotation of said nozzle about an axis of said threaded portion.

8. A nozzle as claimed in claim 7, wherein said ribs extend parallel to a longitudinal axis of said pin.

9. A nozzle as claimed in claim 8, wherein said base includes a pressure plate which extends in a plane perpendicular to said longitudinal axis of said pin and abuts said resilient member.

10. A nozzle as claimed in claim 9, wherein said resilient member is generally conical, and said pin is provided with a conical portion which expands towards a root of said pin and protects a forward portion of said resilient member.

11. A nozzle for forming a plug in a hole in a wall, said nozzle comprising:
- a screw-threaded hollow base for detachably screwing the nozzle to a hot melt gun;
- a tapered pin connected to and extending away from said base in a forward direction along a central longitudinal axis of said nozzle;
- a plurality of passageways in said base, each passageway communicating at one end with an interior of said hollow base and communicating at another end externally of said base and said pin in the vicinity of a junction between said pin and said base;
- a flexible seal of resilient material mounted on said base adjacent a forward end thereof and extending outwardly of said base away from said axis;
- said seal having a forwardly facing flat face for engaging and sealing against said wall externally of said hole when said pin is inserted in said hole; and
- said forwardly facing face having an inner periphery surrounded by an outer periphery, and said face having at least one escape groove therein extending away from said axis from said inner periphery to said outer periphery to permit escape from said hole of any excess material injected into said hole through said passageways.

12. The nozzle of claim 11, wherein said seal is slidably mounted on said base for movement therealong away from said pin, and further comprising resilient means, mounted on said base, for resiliently biasing said seal in said forward direction.

13. The nozzle of claim 12, wherein said seal is mounted on a collar surrounding and slidable along said base, said resilient means comprises a spring surrounding said base and acting between said collar and a flange on said base rearwardly of said collar.

14. The nozzle of claim 11, wherein each of said passageways extends forwardly from said one end to said another end, the another ends of said passageways being spaced around and adjacent a root portion of said pin at said junction between said pin and said base.

15. The nozzle of claim 14, wherein:
- said another ends are located in a forwardly facing surface of said base at a front end of a bore in said base, said bore opening rearwardly at a rear end of said base;
- said seal is slidably mounted on said base; and further comprising:
- a spring acting between said seal and a flange on said base and resiliently urging said seal forwardly with respect to said base.

16. A nozzle for forming a plug in a wall, said nozzle comprising:
- a screw-threaded hollow base for detachably screwing the nozzle to a hot melt gun;
- a tapered pin connected to and extending away from said base in a forward direction along a central longitudinal axis of said nozzle;
- a plurality of passageways in said base, each passageway communicating at one end with an interior of said hollow base and communicating at another end externally of said base and said pin in the vicinity of a junction between said pin and said base;
- a flexible seal mounted on said base adjacent a forward end thereof and extending outwardly of said base away from said axis;
- said seal being slidably mounted on said base for movement therealong away from said pin;
- resilient means, mounted on said base, for resiliently biasing said seal in said forward direction;
- said seal having a collar; and
- said passageways extending outwardly away from said axis with said another end of each passageway being closed by said collar in a forward position thereof, rearward movement of said collar away from said pin opening said another end of each passageway.

17. The nozzle of claim 16, wherein said nozzle is mounted on said hot melt gun, said screw-threaded base being threadedly engaged in a correspondingly threaded tip of said hot melt gun.

18. A nozzle for forming a plug in a wall, said nozzle comprising:
- a base having an externally threaded hollow rear portion and a hollow forward portion;
- a pin extending forwardly from said forward portion away from said rear portion;
- a passageway through said pin, said passageway communicating at a rear end with an interior of said base, and said passageway opening at a forward end through a forward tip of said pin;
- a seal of resilient material mounted on and surrounding said base forward portion, said seal being conical and tapering inwardly and forwardly towards said pin; and
- a plurality of ribs extending outwardly from said seal.

19. The nozzle of claim 18, wherein:
- said forward portion has a forward conical portion adjacent said pin, said forward conical portion forming an extension of said conical seal;
- said base forward portion is provided with a pressure plate adjacent said threaded rear portion; and further comprising:
- a spring-loaded ball valve disposed in said base interior and urged rearwardly against a valve seat formed in said base interior.

* * * * *